United States Patent
Jamadagni et al.

(10) Patent No.: US 9,008,120 B2
(45) Date of Patent: Apr. 14, 2015

(54) METHOD AND APPARATUS FOR ENABLING COMMUNICATION BETWEEN A MOBILE DEVICE AND UNIVERSAL PLUG AND PLAY DEVICES

(75) Inventors: Satish Nanjunda Swamy Jamadagni, Bangalore (IN); Kiran Bharadwaj Vedula, Bangalore (IN)

(73) Assignee: Samsung Electronics Co., Ltd., Suwon-Si (KR)

( * ) Notice: Subject to any disclaimer, the term of this patent is extended or adjusted under 35 U.S.C. 154(b) by 92 days.

(21) Appl. No.: 13/580,137

(22) PCT Filed: Feb. 21, 2011

(86) PCT No.: PCT/KR2011/001120
§ 371 (c)(1),
(2), (4) Date: Aug. 20, 2012

(87) PCT Pub. No.: WO2011/102688
PCT Pub. Date: Aug. 25, 2011

(65) Prior Publication Data
US 2012/0320893 A1     Dec. 20, 2012

(30) Foreign Application Priority Data

Feb. 19, 2010   (IN) .............................. 431/CHE/2010
Feb. 18, 2011   (IN) .............................. 431/CHE/2011

(51) Int. Cl.
H04J 3/16         (2006.01)
H04L 12/28        (2006.01)
(Continued)

(52) U.S. Cl.
CPC ........ *H04L 12/2818* (2013.01); *H04L 12/2836* (2013.01); *H04L 12/66* (2013.01); *H04M 7/125* (2013.01); *H04L 12/2816* (2013.01); *H04W 76/022* (2013.01)

(58) Field of Classification Search
CPC ............ H04L 67/2823; H04L 47/2408; H04L 12/2836; H04L 12/28; H04W 76/00; H04W 76/02; H04W 36/00; H04J 3/16
USPC ......... 370/328, 400, 389, 392, 401, 465, 466, 370/338; 709/223, 227, 224, 246, 218
See application file for complete search history.

(56) References Cited

U.S. PATENT DOCUMENTS 7,376,723 B2 *   5/2008   Cho et al. ...................... 709/223
7,788,409 B2 *   8/2010   Doumuki et al. .............. 709/246
(Continued)

FOREIGN PATENT DOCUMENTS

WO   WO 2007/073403 A1   6/2007
WO   WO 2009/132435 A1   11/2009

OTHER PUBLICATIONS

International Search Report dated Oct. 28, 2011 in connection with International Patent Application No. PCT/KR2011/001120.
(Continued)

*Primary Examiner* — Hanh N Nguyen

(57) ABSTRACT

The present invention provides methods and devices for enabling communication between a mobile device and Universal Plug and Play (UPnP) devices. In one embodiment, a communication gateway includes a home base station for receiving a data communication request from a mobile device associated with a radio network, where the data communication request indicates type of communication. The communication gateway also includes a mediation entity for signalling an UPnP router that the data communication request is associated with an UPnP type communication. Moreover, the communication gateway includes an UPnP router for providing data communication from the mobile device to one or more UPnP devices connected to the UPnP router.

18 Claims, 5 Drawing Sheets

(51) Int. Cl.
*H04L 12/66* (2006.01)
*H04M 7/12* (2006.01)
*H04W 76/02* (2009.01)

(56) References Cited

U.S. PATENT DOCUMENTS

| | | | | |
|---|---|---|---|---|
| 7,921,194 | B2* | 4/2011 | Song et al. | 709/223 |
| 8,307,093 | B2* | 11/2012 | Klemets et al. | 709/227 |
| 8,406,167 | B2* | 3/2013 | Den Hartog et al. | 370/328 |
| 8,477,748 | B2* | 7/2013 | Shinozaki | 370/338 |
| 2006/0291487 | A1 | 12/2006 | Naqvi et al. | |
| 2009/0156213 | A1 | 6/2009 | Spinelli et al. | |
| 2009/0164547 | A1 | 6/2009 | Ch'ng et al. | |
| 2009/0282458 | A1 | 11/2009 | Hjelm | |
| 2010/0165957 | A1 | 7/2010 | Hegde et al. | |

OTHER PUBLICATIONS

Written Opinion of International Searching Authority dated Oct. 28, 2011 in connection with International Patent Application No. PCT/KR2011/001120.

Extended European Search Report dated Jul. 12, 2013 in connection with European Patent Application No. 11744930.6, 7 pages.

* cited by examiner

METHOD AND APPARATUS FOR ENABLING COMMUNICATION BETWEEN A MOBILE DEVICE AND UNIVERSAL PLUG AND PLAY DEVICES

CROSS-REFERENCE TO RELATED APPLICATION(S)

The present application claims priority under 35 U.S.C. §365 to International Patent Application No. PCT/KR2011/001120 filed Feb. 21, 2011, entitled "METHOD AND APPARATUS FOR ENABLING COMMUNICATION BETWEEN A MOBILE DEVICE AND UNIVERSAL PLUG AND PLAY DEVICES". International Patent Application No. PCT/KR2011/001120 claims priority under 35 U.S.C. §365 and/or 35 U.S.C. §119(a) to Indian Patent Application Nos. 431/CHE/2010 filed Feb. 19, 2010 and 431/CHE/2010 filed Feb. 18, 2011 and which are incorporated herein by reference into the present disclosure as if fully set forth herein.

TECHNICAL FIELD

The present invention relates to the field of communication, and more particularly relates to communication between a mobile device in a radio network and universal plug and play (UPnP) devices in an UPnP based home network.

BACKGROUND ART

Universal Plug and Play (UPnP) technology defines architecture for pervasive peer-to-peer network connectivity of intelligent appliances, wireless devices, and personal computers of all types. UPnP technology is designed to bring easy-to-use, flexible, standards-based connectivity to ad-hoc or unmanaged networks whether in the home, in a small business, public locations, or systems connected to the Internet. UPnP technology provides a distributed, open networking architecture that leverages TCP/IP and web technologies to enable seamless proximity networking, in addition to providing control and data transfer among networked devices.

UPnP Device Architecture (UDA) is designed to support zero-configuration, "invisible" networking, as well as automatic discovery for a breadth of device categories from a wide range of vendors. Under this architecture, a device can dynamically join a network, obtain an IP address, convey the device's capabilities, and learn about the presence and capabilities of other devices within the network. Typically, in UPnP Device Architecture, multiple UPnP devices are interconnected via a customer premise equipment (CPE).

In 3GPP network, home base-stations, which are also referred to as "femto cells," may be deployed in residences, in public hot-spot areas and in enterprises, e.g., company buildings or campuses, to provide wireless coverage using 3G and 4G technologies. With public hot-spot and enterprise deployments, femto cells are deployed as a connection of radio nodes that allow a mobile device to maintain a call while travelling through the physical domain of the enterprise.

DISCLOSURE OF INVENTION

Technical Problem

The mobile device associated with a femto cell may wish to locally access UPnP devices available within service area of the femto cell or the CPE involving in one part the femto cell. However, currently local access of the UPnP devices by the mobile device is enabled through a core network, resulting in clogging of resources associated with the core network.

Solution to Problem

The present invention provides methods and devices for enabling communication between a mobile device and Universal Plug and Play (UPnP) devices. In one aspect, a method of a communication gateway for enabling a mobile device to access to at least one UPnP device in an UPnP based home network includes receiving a data communication request from the mobile device associated with a radio network by a home base station of the communication gateway, where the data communication request indicates type of communication. The method includes signalling an UPnP router of the communication gateway that the data communication request is associated with an UPnP type communication via a mediation entity of the communication gateway based on the received data communication request.

Also, the method includes establishing data communication between the mobile device and at least one UPnP device communicatively coupled to the UPnP router through the mediation entity. Moreover, the method may include publishing capability of the communication gateway to support an UPnP type data communication to the mobile device by the home base station. The method may also include communicating an identifier associated with the mobile device to the core network indicative of the ongoing data communication between the mobile device and the at least one UPnP device.

In another aspect, a non-transitory computer-readable storage medium having instructions stored therein for enabling a mobile device to access to at least one UPnP device in an UPnP based home network, that when executed by a communication gateway, cause the communication gateway to perform a method described above.

In yet another aspect, a communication gateway includes a home base station for receiving a data communication request from a mobile device associated with a radio network, where the data communication request indicates type of communication. The communication gateway also includes a mediation entity for signaling an UPnP router that the data communication request is associated with an UPnP type communication. Moreover, the communication gateway includes an UPnP router for providing data communication from the mobile device to one or more UPnP devices connected to the UPnP router.

Other features of the embodiments will be apparent from the accompanying drawings and from the detailed description that follows.

MODE FOR THE INVENTION

The present invention provides a method and apparatus for enabling communication between a mobile device and universal plug and play devices. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
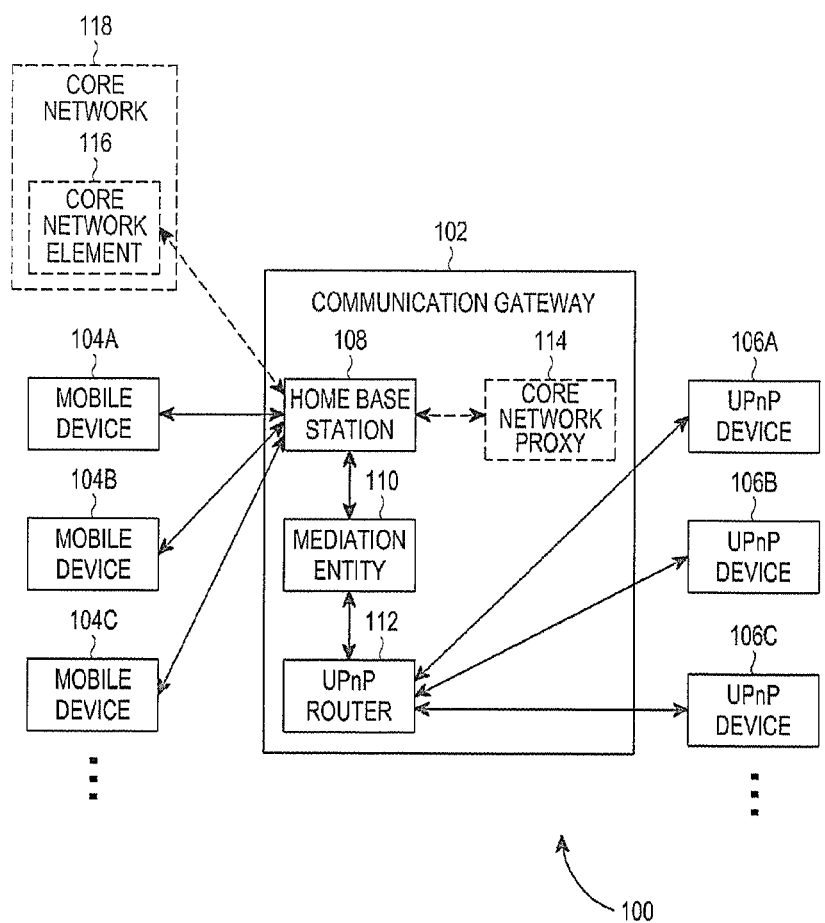
FIG. 1 illustrates a block diagram of a communication system implementing a communication gateway for enabling communication between one or more mobile devices and UPnP devices in an UPnP based home network, according to one embodiment.

FIG. 1 illustrates a block diagram of a communication system 100 implementing a communication gateway 102 for enabling communication between one or more mobile devices 104A-N and UPnP devices 106A-N in an UPnP based home network, according to one embodiment. In FIG. 1, the communication system 100 includes the communication gateway 102, mobile devices 104A-N, and an UPnP devices 106A-N. The communication gateway 102 includes a home base station 108, a mediation entity 110, and an UPnP router 112, and a core network proxy 114 (e.g. non-access stratum emulation entity).

The mobile devices 104A-N may include smart phones, cell phones, personal digital assistants and like devices accessing the radio network. The mobile devices 104A-N may include devices located in the coverage area of the home base station 108 (e.g., femto cell, GAN cell, HNB cell, HeNB cell and the like) and wirelessly coupled to the home base station 108. Similarly, the UPnP devices 106A-N in an UPnP based home network may be wired or wirelessly coupled to the UPnP router 112. The mediation entity 110 is communicatively coupled to the home base station 108 and the UPnP router 112. The core network proxy 114 is communicatively connected to the home base station 108 to perform proxy functions of core network entities beyond the home base station.

Consider that, the mobile device 104A has moved in the coverage area of the home base station 108 and wishes to access one or more of the UPnP devices 106A-N. In such case, the mobile device 104A sends a data communication request to the home base station for accessing the one or more UPnP devices 106A-N. When the mobile device 104A has moved in the coverage area of the home base station 108, the home base station 108 publishes capability of the communication gateway to support UPnP type communication. In one exemplary implementation, the home base station 108 indicates to the mobile device 104A that it can support a local type communication or a UPnP type communication by publishing a public land mobile network (PLMN) identifier (which is different from the PLMN identifier that identifies the operator). This can also be achieved by a dedicated messaging between the home base station 108 and the mobile device 104A.

It can be noted that, it is only after determining whether the communication gateway supports local access to the UPnP devices 106A-N, the mobile device 104A sends the data communication request. For example, the data communication request may be a radio resource connection (RRC) request or a non-access stratum (NAS) request. In one embodiment, the data communication request may indicate type of communication associated with the data communication. In case, the communication is associated with the one or more UPnP devices 106A-N, the data communication request may include a local call identifier indicative of an UPnP type communication. In one embodiment, the home base station 108 can publish a Public Land Mobile Network (PLMN) identifier other than the operator supporting PLMN identifier to enable the mobile devices 104A-N know that the associated home base station 108 supports local access data communication. In another embodiment, the same indication can be supported over any dedicated messaging between the home base station 108 and the mobile devices 104A-N.

The home base station 108 may then forward the data communication request to the core network proxy 114 residing in the communication gateway 102. The core network proxy 114 may determine whether the data communication request is associated with an UPnP type communication or a local type communication. In other words, the core network proxy 114 determines whether the mobile device 104A wishes to access the one or more UPnP devices 106A-N. In case of absence of the core network proxy 114 in the communication gateway 102, the home base station 108 may forward the data communication request to a core network element 116 (e.g., a mobility management element (MME)) of a core network 118. In such a case, the above determination is made by the core network element 116.

Accordingly, the core network proxy 114 indicates the home base station 108 that the data communication request is associated with the UPnP type communication. It can be noted that, if the data communication request is associated with the local type communication, then the data communication request is handled by the core network 118 for further processing. The home base station 108 signals the UPnP router 112 that the data communication request is associated with the UPnP type communication and the mobile device 104A wishes to access the one or more UPnP devices 106A-N. As a result, the UPnP router establishes a data communication between the mobile device 104A and the one or more UPnP device 106A-N. The data communication may include a call, a MMS message, email message, SMS message, instant message and the like.

Also, once the data communication is established, the home base station 108 communicates identifier associated with the mobile device 104 to the core network element 116 indicating that the mobile device 104 is in communication with the UPnP devices 106A-N. During the data communication, the home base station 108 may forward data communication signal received from the mobile device 104A to the mediation entity 110. The mediation entity 110 converts the data communication signal associated with the data communication in an UPnP compatible format and provides the converted data communication signal to the UPnP router 112 which then routes the data communication signal to the desired UPnP device 106A-N. In accordance with one or more embodiments, in order to support UPnP/DLNA service advertisements, the core network proxy 114 or the mediation entity 110 may retransmit UPnP service advertisements to the mobile device 104A after changing source address.

Figure 2:
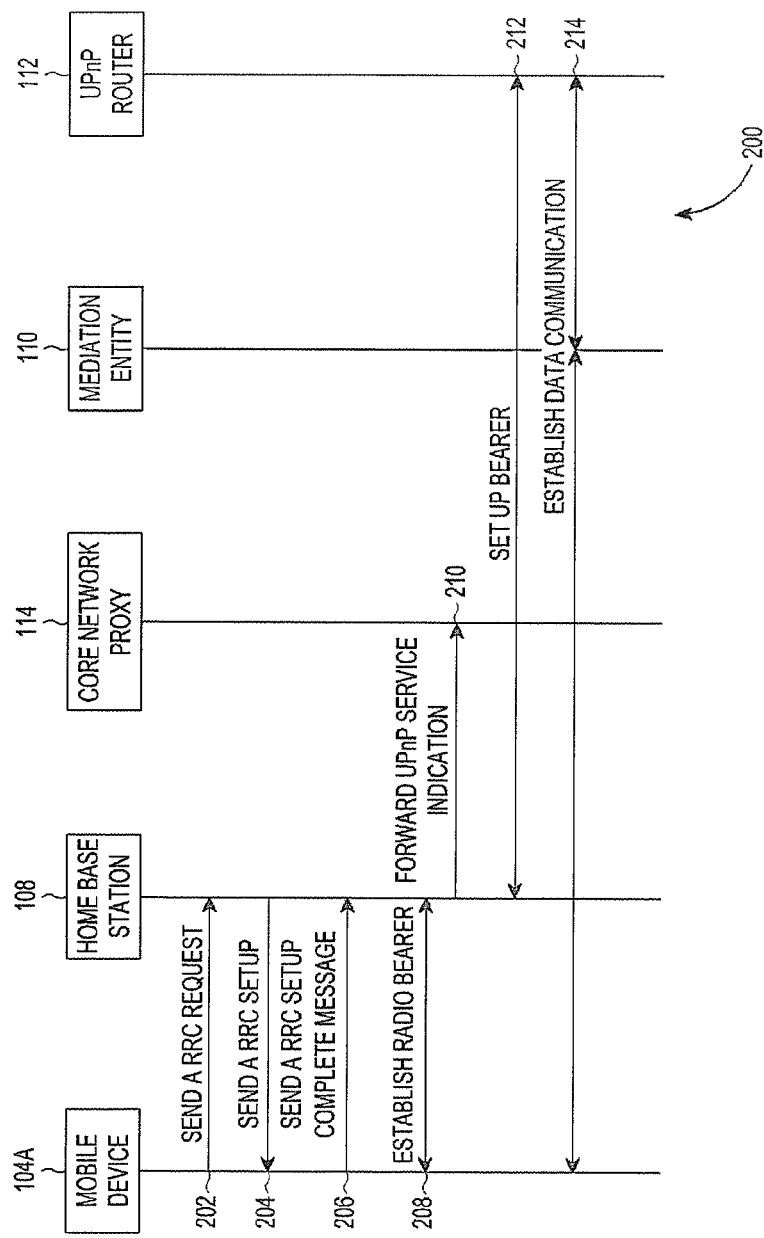
FIG. 2 illustrates a process flow diagram of an exemplary method of handling data communication request by a core network proxy residing in the communication gateway, according to one embodiment.

FIG. 2 illustrates a process flow diagram 200 of an exemplary method of handling data communication request by the core network proxy 114 residing in the communication gateway 102, according to one embodiment. At step 202, the mobile device 104A sends a radio resource connection request to the home base station 108. At step 204, the home base station 108 transmits a radio resource connection set up to the mobile device 104A. At step 206, the mobile station 104A sends a radio resource connection setup complete message to the home base station 108.

At step 208, a radio bearer is established between the mobile device 104A and the home base station 108. At step 210, the home base station 108 forwards UPnP service indication to the core network proxy 114. At step 212, the core network proxy 114 sets up a bearer between the home base station 108 and the UPnP router 112 using the mediation entity 110. At step 214, the mediation entity 110 enables data communication between the mobile device 104A and the UPnP router 112 associated with the UPnP devices 106A-N.

Figure 3:
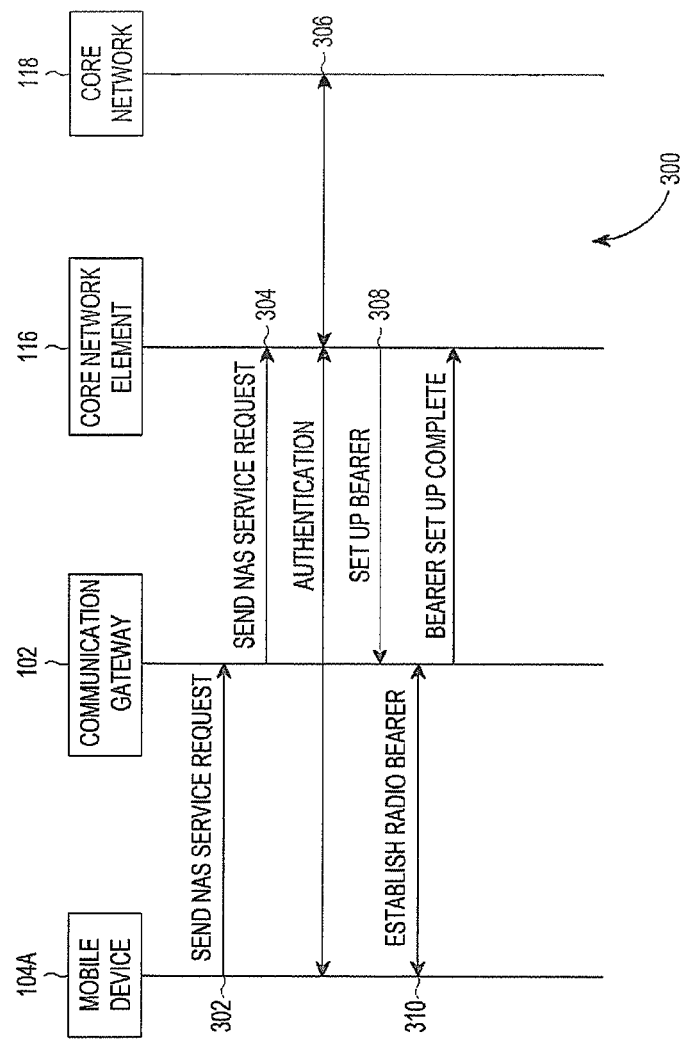
FIG. 3 illustrates a process flow diagram of an exemplary method of redirecting bearer establishment across a mediation entity by a core network element residing in a core network when a NAS service request is associated with an UPnP type communication, according to one embodiment.

FIG. 3 illustrates a process flow diagram 300 of an exemplary method of redirecting bearer establishment across the mediation entity 110 by the core network element 116 residing in the core network 118 when a NAS service request is associated with an UPnP type communication, according to one embodiment. At step 302, the mobile device 104A sends a NAS service request to the home base station 108. At step 304, the home base station 108 forwards the NAS service request to the core network element 116 at the core network 118. At step 306, the core network element 116 authenticates the mobile device 104A based on the NAS service request.

At step 308, the core network element 118 sets up a bearer between the home base station 108 and the UPnP router 112 using the mediation entity 110. At step 310, the core network element 118 establishes a radio bearer between the mobile device 104A and the home base station 108.

Figure 4:
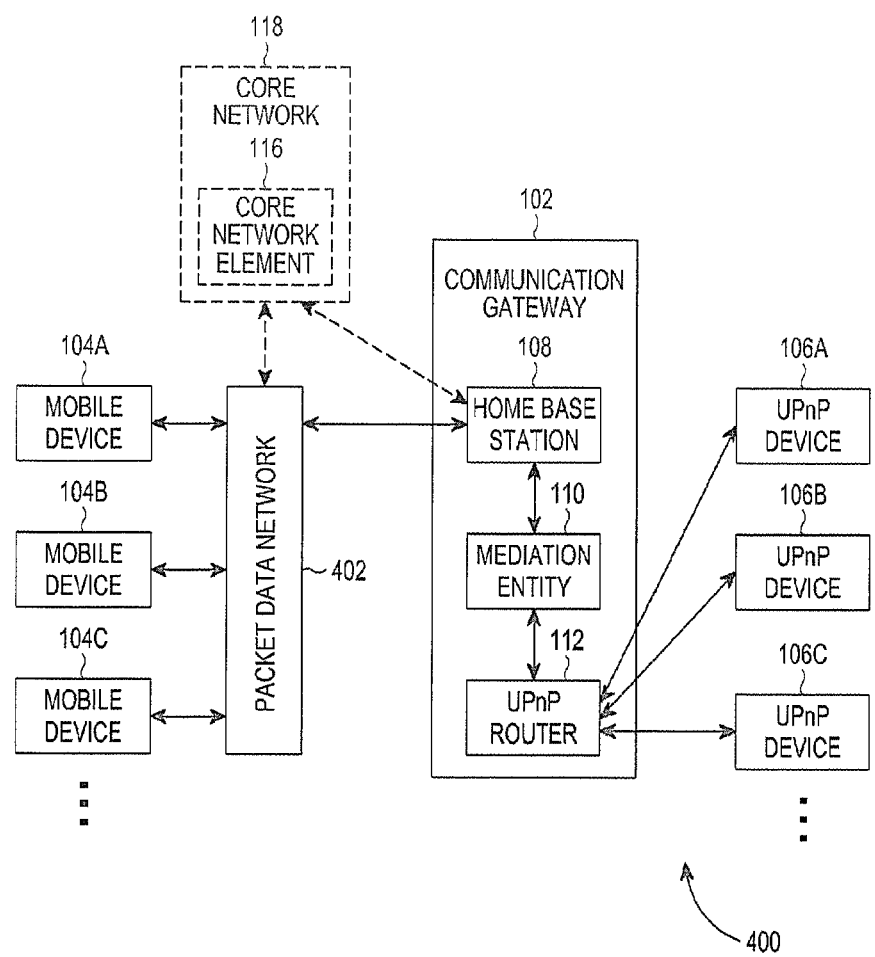
FIG. 4 illustrates a block diagram of a communication system implementing a communication gateway for enabling communication between one or more mobile devices and UPnP devices in an UPnP based home network, according to another embodiment.
Figure 5:
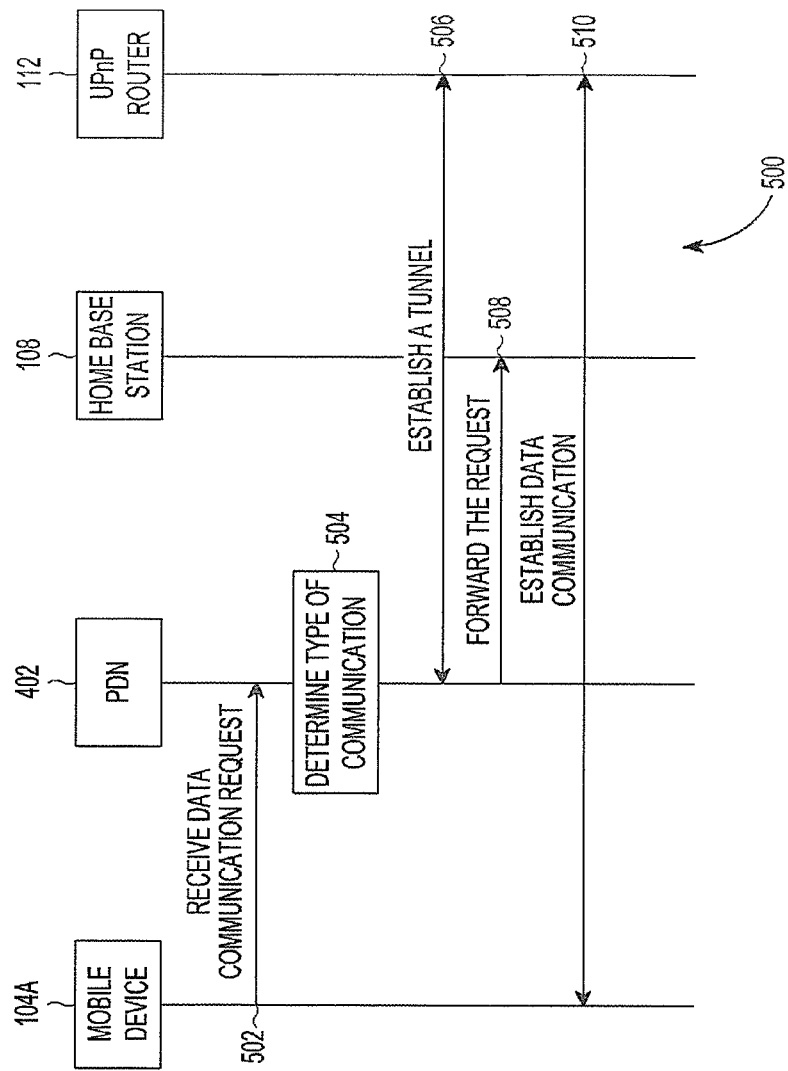
FIG. 5 illustrates a process flow diagram of an exemplary method of handling data communication request by a packet data network when a mobile device is remotely located from the communication gateway, according to one embodiment.

FIG. 4 illustrates a block diagram of a communication system 400 implementing a communication gateway 102 for enabling communication between one or more mobile devices 104A-N and UPnP devices 106A-N in an UPnP based home network, according to another embodiment. It can be seen that, the communication system 400 in FIG. 4 is similar to the communication system 100 in FIG. 1, except that in the communication system 400 illustrates a case when the mobile devices 104A-N are outside the coverage area of the home base station 108 (i.e., remotely located from the home base station 108. With reference to FIGS. 4 and 5, when the mobile device 104A is remotely located from the home base station 108 and wishes to access the UPnP device 106A-N using the communication gateway 102, a packet data network 402 receives a data communication request from the mobile device 104A (step 502).

The PDN 402 then determines whether the data communication request is associated with the UPnP type communication (step 504). Accordingly, the PDN 402 establishes a tunnel between the PDN 402 and the UPnP router via the mediation entity 110 by signalling the home base station 108 (step 506). Upon establishment, the PDN 402 forwards the data communication request to the home base station 108 (step 508). In this manner, the data communication is established between the mobile device 104A and the UPnP devices 106A-N via the UPnP router (step 510).

The present embodiments have been described with reference to specific example embodiments, it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of a base station for enabling a mobile device to access at least one universal plug and play (UPnP) device in a communication network, comprising:
    receiving, from the mobile device, a data communication request including information about a communication type;
    if the communication type according to the information is an UPnP type for accessing the at least one UPnP device, transmitting, to an UPnP router, the data communication request via a mediation entity, wherein the mediation entity converts a format of a signal including the data communication request received from the base station according to a UPnP compatible format; and
    establishing a bearer between the base station and the UPnP router for data communication between the mobile device and the at least one UPnP device through the mediation entity.

2. The method of claim 1, further comprising:
    if the communication type according to the information is not the UPnP type, transmitting the data communication request to a core network.

3. The method of claim 1, wherein the information includes an identifier indicating one of an UPnP type communication and a local type communication.

4. The method of claim 1, wherein the receiving the data communication request comprises:
    establishing a radio bearer between the mobile device and the base station;
    transmitting the data communication request to a core network proxy, wherein the core network proxy performs proxy functions of core network entities beyond the base station; and
    receiving, from the core network proxy, information indicating whether the communication type according to the information is the UPnP type.

5. The method of claim 1, wherein the receiving the data communication request comprises:
    receiving the data communication request from the mobile device via a packet data network (PDN); and
    receiving, from the PDN, information indicating whether the communication type according to the information is the UPnP type.

6. The method of claim 1, wherein the data communication request is one of a radio resource connection (RRC) request and a non-access stratum (NAS) request.

7. A non-transitory computer-readable storage medium having instructions stored therein for enabling a mobile device to access at least one universal plug and play (UPnP) device in a communication network, the instructions configured to, when executed by a base station, cause the base station to perform a method comprising:
    receiving, from the mobile device, a data communication request including information about a communication type;
    if the communication type according to the information is an UPnP type for accessing the at least one UPnP device, transmitting, to an UPnP router, the data communication request via a mediation entity, wherein the mediation entity converts a format of a signal including the data communication request received from the base station according to a UPnP compatible format; and establishing a bearer between the base station and the UPnP router for data communication between the mobile device and the at least one UPnP device through the mediation entity.

8. The non-transitory computer-readable storage medium of claim 7, wherein the method further comprises:

if the communication type according to the information is not the UPnP type, transmitting the data communication request to a core network.

9. The non-transitory computer-readable storage medium of claim 7, wherein the information includes an identifier indicating one of an UPnP type communication and a local type communication.

10. The non-transitory computer-readable storage medium of claim 7, wherein the instructions to receive the data communication request comprise:

establishing a radio bearer between the mobile device and the base station;

transmitting the data communication request to a core network proxy, wherein the core network proxy performs proxy functions of core network entities beyond the base station; and receiving, from the core network proxy, information indicating whether the communication type according to the information is the UPnP type.

11. The non-transitory computer-readable storage medium of claim 10, wherein the instructions to receive the data communication request comprise:

receiving the data communication request from the mobile device via a packet data network (PDN); and receiving, from the PDN, information indicating whether the communication type according to the information is the UPnP type.

12. The non-transitory computer-readable storage medium of claim 7, wherein the data communication request is one of a radio resource connection (RRC) request and a non-access stratum (NAS) request.

13. A base station in a communication network, comprising:

a receiver configured to receive, from a mobile device, a data communication request including information about a communication type;

a transmitter configured to, if the communication type according to the information is an UPnP type for accessing the at least one UPnP device, transmit to an universal plug and play (UPnP) router, the data communication request via a mediation entity, wherein the mediation entity is configured to convert a format of a signal including the data communication request, received from the base station according to a UPnP compatible format; and a controller configured to establish a bearer between the base station and the UPnP router for data communication between the mobile device and the at least one UPnP device through the mediation entity.

14. The base station of claim 13, wherein the transmitter is configured to transmit the data communication request to a core network, if the communication type according to the information is not the UPnP type.

15. The base station of claim 13, wherein the information includes an identifier indicating one of an UPnP type communication and a local type communication.

16. The base station of claim 7, wherein the controller is configured to control the receiver for receiving the data communication request from the mobile device, to establish a radio bearer between the mobile device and the base station, to control the transmitter for transmitting the data communication request to a core network proxy, wherein the core network proxy performs proxy functions of core network entities beyond the base station, and to receive, from the core network proxy, information indicating whether the communication type according to the information is the UPnP type, by controlling the receiver.

17. The base station of claim 13, wherein the receiver is configured to receive the data communication request from the mobile device via a packet data network (PDN), and receive, from the PDN, information indicating whether the communication type according to the information is the UPnP type.

18. The base station of claim 13, wherein the data communication request is one of a radio resource connection (RRC) request and a non-access stratum (NAS) request.

* * * * *